United States Patent [19]

Smitka

[11] 4,297,049

[45] Oct. 27, 1981

[54] DEVICE FOR ATTACHING TWO METAL SHEETS OR BLANKS TOGETHER

[76] Inventor: Günter Smitka, Friedenstr. 9, 5868 Letmathe, Fed. Rep. of Germany

[21] Appl. No.: 36,049

[22] Filed: May 4, 1979

[30] Foreign Application Priority Data

Aug. 2, 1978 [DE] Fed. Rep. of Germany ....... 2833801

[51] Int. Cl.³ ............................................ F16B 17/00
[52] U.S. Cl. .................................... 403/403; 403/405
[58] Field of Search ................ 24/73 B, 73 BP, 73 D, 24/73 MF, 73 PP, 73 SM, 73 TL, 101 B; 403/230, 233, 281, 282, 403, 405, 406

[56] References Cited

U.S. PATENT DOCUMENTS

| | | | |
|---|---|---|---|
| 1,246,163 | 11/1917 | Rowe | 24/101 B |
| 2,013,446 | 9/1935 | Reiter | 24/73 PP |
| 2,908,955 | 10/1959 | Brown | 24/73 D |
| 3,511,525 | 5/1970 | Friedling et al. | 403/405 |
| 3,606,415 | 9/1971 | Friedling et al. | 403/405 X |
| 3,837,136 | 9/1974 | Graham et al. | 403/405 X |
| 3,919,826 | 11/1975 | Mez | 403/403 |
| 4,154,547 | 5/1979 | Mez | 403/405 X |

Primary Examiner—Thomas J. Holko
Attorney, Agent, or Firm—Jacobs & Jacobs

[57] ABSTRACT

Device for attaching two metal sheets or blanks together for absorbing the forces occurring particularly in ventilating systems to prevent loosening without requiring supplemental sealing means. The sheets or blanks to be fastened to one another are specially shaped and configured and are formed from blanks configured appropriately for the desired purpose. The clamped sheets are deformable in a corrugated-like manner in the region of clamping and within described parameters make it possible to secure previously unobtained extraction forces. The degree of bend and the angle and spacing between the legs determine the transmission of force.

2 Claims, 7 Drawing Figures

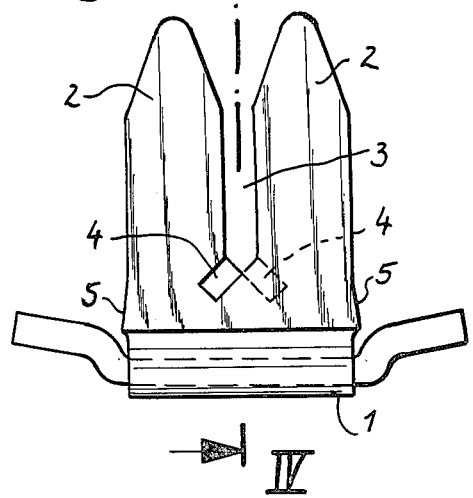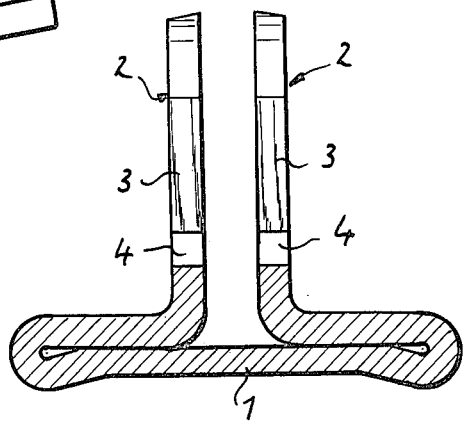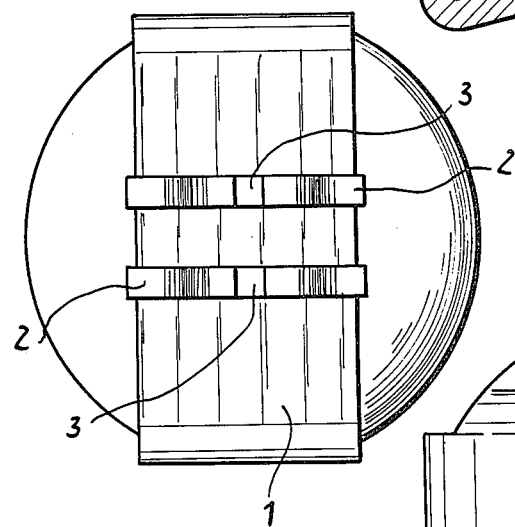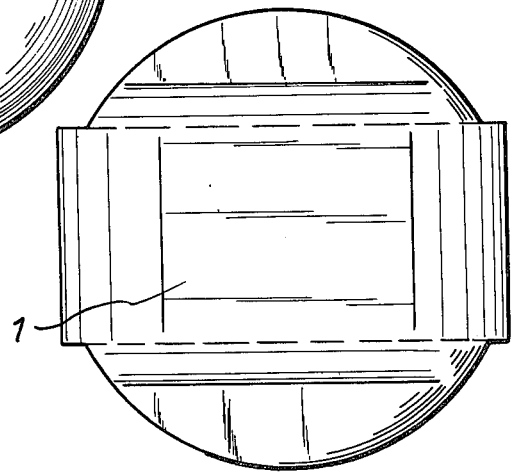

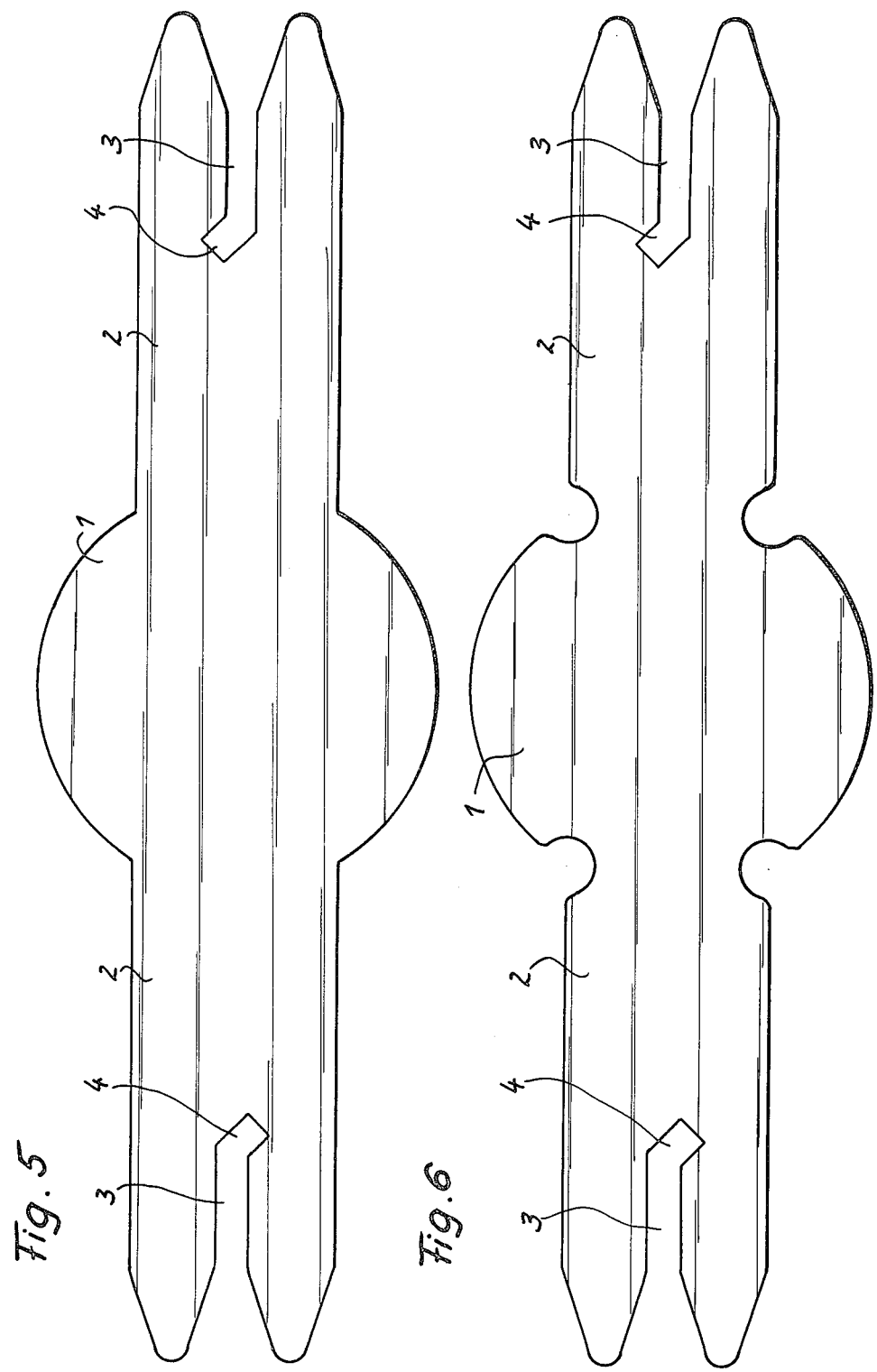

DEVICE FOR ATTACHING TWO METAL SHEETS OR BLANKS TOGETHER

The present invention relates generally to a device for fastening to each other two metal sheets or blanks arranged approximately perpendicular to each other by means of a fastening clamp which has a head and a double-arm slit shank and the shank of which is passed through the one metal sheet so that the head lies at least indirectly on said sheet and the other sheet is clamped between the slots of the arms of the shank which are arranged parallel to each other. The fastening means or element of the device is cut from sheet metal and bent. It furthermore is provided with conical edges at the slot openings intended to facilitate insertion.

Similar devices are known from West German Unexamined Application for Patent No. 21 63 763.

The known devices serve, in the same manner as the present device, predominantly to attach guide walls in air conduit ducts for air conditioning systems and the like. Such guide walls are used particularly upon an arcuate course of the duct. For this purpose, holes are drilled at suitable points for the shanks of fastening elements, the guide wall is aligned below the same and the fastening element is clamped, by hammer blows, through the hole onto the edges of the guide wall.

The known devices have the important defect that they, on the one hand, do not make it possible to apply sufficient pulling-out forces and, on the other hand, they are expensive to manufacture in a manner to try to eliminate this defect. Since this is a mass-produced article, savings in material and/or manufacturing expense are definitely desirable.

Furthermore in the known devices, plastic washers or the like are also necessary in order to seal off the holes.

The object of the present invention is to create a device which can take up the forces which occur in particular in ventilation systems and thus eliminate the danger of the attachment loosening. In this connection, a very simple solution from the standpoint of manufacture is to be found in which additional sealing means for the sealing-off of the holes can be dispensed with.

In order to obtain a dependable attachment having previously unobtained extraction forces it is necessary that the clamped sheet can deform in a somewhat corrugated manner in the region of clamping.

For this purpose, however, a sufficient spacing must be maintained between the legs.

The degree of bend is determined in practice by two limiting parameters. If the angle is too small, sufficient interlocking is not obtained, resulting in only insufficient clamping force. If the angle is too large, the base plate tears and the transmission of force is impossible.

Between these extremes there is a large number of possible angular positions.

The bends produced at any angle of 20° to 60°, preferably 45°, have to be particularly desirable but variations of slot width to sheet metal thickness, strength of materials and nature of materials are permissible within the scope of the invention and form part thereof. Other variants and modifications will be understood or described hereinafter.

By oblique slots which widen towards the head, the result is obtained that, for instance, with a slot width at the foot of the introduction bevels of 0.8 mm and a width of 1.2 mm at the start of the bends, metal sheets of thickness of between 0.75 and 1.2 mm can be suitably clamped and interlocked with the same fastening element. In this connection, the arms do not spread and hair cracks on the ends of the arms close to the bend are avoided and also hair cracks in the transition regions are avoided.

A preferred embodiment of the invention is illustrated in the accompanying drawing wherein:

FIG. 1 illustrates in side view a fastening clamp according to the invention;

FIG. 2 shows the same in top view;

FIG. 3 shows the same in bottom view;

FIG. 4 is a sectional view of the clamp along the line IV—IV of FIG. 1;

FIG. 5 is a plan view of a sheet-metal blank useful in the present invention;

FIG. 6 is a variant of FIG. 5; and

Figure 7:
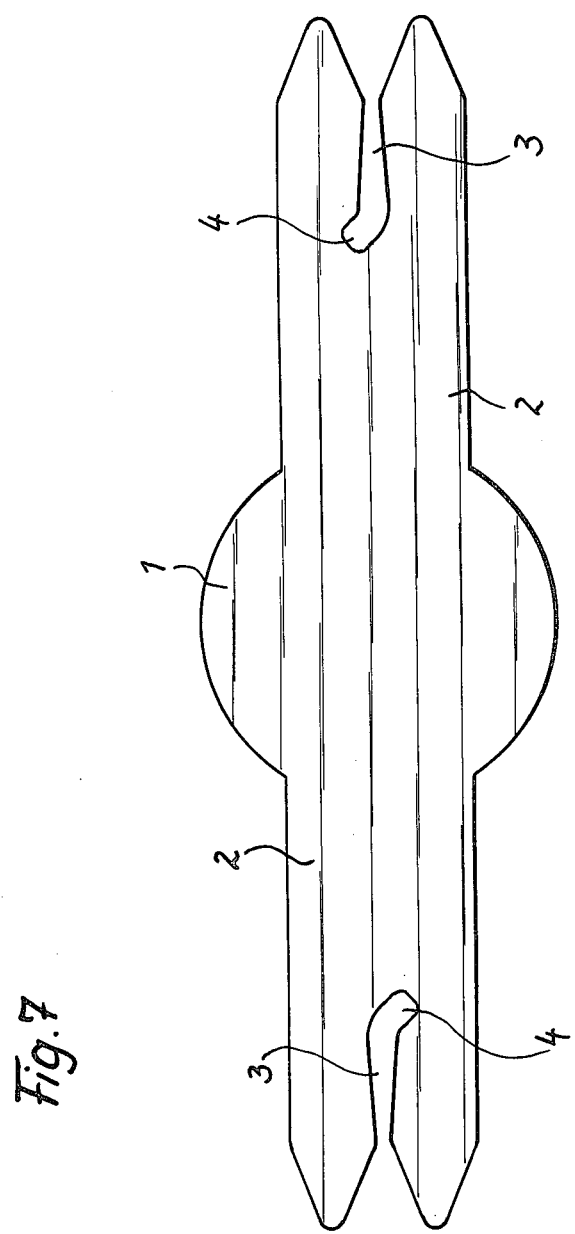
FIG. 7 is still another variant.

The figures of the drawing show the actual device on a scale of 5:1 but such is not a limitation on the invention.

In the drawing, the fastening clamp has a head 1 produced by folding and, adjoining same, arms 2 forming the shank, with a longitudinal slot 3 in each arm.

The arms 2 are at a distance apart equal to approximately twice the thickness of the material of the metal sheet to be clamped. The longitudinal slot 3 is open at the front, the insertion ends of the arms 2 being beveled. In the region close to the head the longitudinal slots 3 pass into bends 4 which form an angle of 45° with the corresponding longitudinal slot 3. The perpendicular distance of the end of the bend from the longitudinal slot is approximately equal to the thickness of the fastening sheet. The bends 4 of the two arms 2 are directed in opposite directions so that they form an angle of 90° with each other (shifted in space).

Customary sheet-metal thicknesses of the metal sheets to be clamped are 1 mm and less.

The slot width is adapted to this measurement; and depending on the requirements, the longitudinal slot 3, including the bend 4, can be equal to or narrower or wider than this measurement.

The entire clamp is made of spring steel.

The head 1 of the clamp is bent in the region lying alongside the arms 2 (FIG. 1) and curved in hood-like fashion so as to obtain an initial spring tension and thus a good seal after mounting has been effected.

In FIG. 1 there are also provided on the arms 2, two obliquely rising ribs 5 which upon the driving of the fastening clamp into a round hole which is adapted to the shank dig themselves into the portions of the edge of the hole and thus hold the fastening clamp in such a manner that it cannot twist.

I claim:

1. A device for fastening to each other two metal sheets or blanks arranged approximately perpendicular to each other by means of a fastening clamp which has a head and a double-arm slit shank and the shank of which is passed through the one metal sheet so that the head lies at least indirectly on said sheet and the other sheet is clamped between the slots of the arms of the shank which are arranged parallel to each other, wherein the two arms forming the shank are at a distance apart which is greater than the thickness of the metal sheet which is to be clamped and is equal particularly to a multiple of said sheet thickness, the slot of each arm widening upwardly to bevels at the tops of the arms and extending approximately perpendicular to the head and being bent in the vicinity of the head, the width of the slot at the tops of the arms being about two-thirds the width of the slot at the start of the bend, the bend of the slot the two arms being arranged at approximately the same level and extending in opposite directions so that an interlocking of the sheet metal clamped into the slots is effected.

2. A device according to claim 1, wherein the transitions from the slot to the bend and to the base of the bend are rounded.

* * * * *